United States Patent [19]

Dolenc et al.

[11] 4,041,752
[45] Aug. 16, 1977

[54] ROLLING MILLS HAVING HYDRAULIC FORCES EXERTED ON THE EXTERIOR ROLL SURFACES

[75] Inventors: Anton Dolenc, Winterthur; Alfred Christ, Zurich; Rolf Lehmann, Mutschellen, all of Switzerland

[73] Assignee: Escher Wyss Limited, Zurich, Switzerland

[21] Appl. No.: 655,768

[22] Filed: Feb. 6, 1976

[30] Foreign Application Priority Data

Feb. 13, 1975 Switzerland ............... 1764/75

[51] Int. Cl.² .................. B21B 29/00; B21B 27/10
[52] U.S. Cl. .................................. 72/201; 72/241; 72/245; 100/162 B
[58] Field of Search ............ 72/241, 245, 237, 201; 29/113 AD, 116 AD; 100/162 B

[56] References Cited

U.S. PATENT DOCUMENTS

| 1,519,657 | 12/1924 | Biggert, Jr. | 72/245 |
| 3,064,509 | 11/1962 | Ford et al. | 72/6 |
| 3,355,924 | 12/1967 | Sendzimir | 72/241 |

*Primary Examiner*—Milton S. Mehr
*Attorney, Agent, or Firm*—Pennie & Edmonds

[57] ABSTRACT

Rolls of a rolling mill have hydraulic pressure exerted on the exterior surfaces thereof by hydrostatic pressure devices which produce hydraulic pressure in the gaps between bearing surfaces of the devices and the roll, and a flow of the hydraulic fluid in the gaps to cool the rolls. The pressure may be applied to press the rolls together, and also to provide lateral support. Different pressures may be applied to devices spaced parallel to the roll axis. Quadrilateral and overlapping rhomboidal bearing surfaces may be employed. A pair of small diameter working rolls may be pressed together by larger diameter pressure rolls and lateral support provided for the working rolls.

14 Claims, 5 Drawing Figures

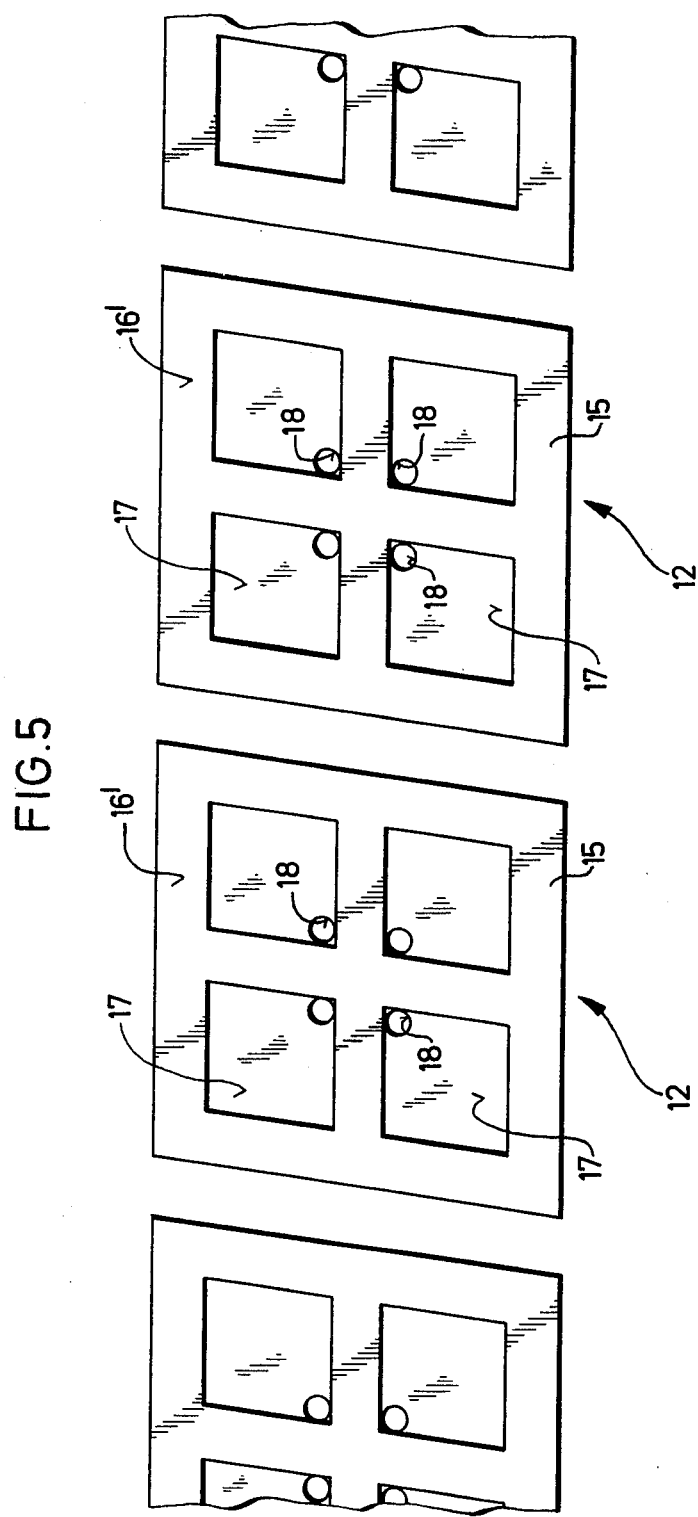

ROLLING MILLS HAVING HYDRAULIC FORCES EXERTED ON THE EXTERIOR ROLL SURFACES

The invention relates to a rolling mill having at least one roll on the external surface of which an hydraulic medium acts directly to generate pressure.

Such rolling mills are known, for example, from British Pat. No. 1,270,169 and from French Pat. No. 608,256. In these mills the roll exposed to the pressure of the hydraulic medium is arranged above a tank containing the medium. Apart from the fact that only one pressure direction (upward) is possible, these rolling mills have the disadvantage that the roll may be unstable and at higher pressures there are difficulties with the sealing of the hydraulic medium between roll and guide.

On the other hand, so-called sag-compensating rolls are known wherein a cylindrical roll shell rotates about a fixed central support beam. Between the support beam and the shell are arranged hydrostatic pressure elements which permit a contact-free support of the shell. Although such rolls are capable of excellent performance, there are cases where the desired performance can be achieved with simpler and cheaper means.

A principal object of the invention is to provide a rolling mill wherein a stable support of the rolls is made possible when using an hydraulic medium acting directly on the external roll surface, wherein the rolling mill is simpler than when using sag-compensating rolls, and wherein the roll surface is in addition intensively cooled.

The rolling mill according to the invention is characterized in that at least one hydrostatic pressure device is provided for applying the pressure to the external surface of one or more rolls of the mill. The pressure device has a piston-type part moving in a cylinder which is fixed with respect to the rolling mill. Hydraulic pressure in the cylinder chamber forces the piston toward the roll surface. The piston has a bearing surface facing the roll surface with several hydrostatic pressure pockets therein which are connected independently of each other to the cylinder by throttle ducts, and the effective cross-section for producing forces on the bearing surface is larger than the effective piston surface exposed to the pressure in the cylinder chamber.

The hydrostatic pressure device provides a contact-free support of the roll, while at the same time the hydraulic pressure medium issuing from the device through a narrow gap between the bearing surface and the roll surface effects an intensive cooling of the roll surface. Thus special cooling of the pressure area can be eliminated or greatly reduced. This is important, for example, in mills for rolling metals or metal foils. In addition, a substantially more uniform cooling effect is achieved in the region of the pressure device than has been possible heretofore. The roll can be of simple design, and may be solid if desired.

The rolling mill can be designed with two rolls cooperating with each other to form a pressure nip for rolling desired material, each roll being provided with hydrostatic pressure devices to exert pressure forces on the rolls in the common axial plane of the rolls and in opposite directions. With such a design, sagging of the rolls in the pressing direction can be practically completely eliminated.

One of the rolls can be rotatably mounted in fixed bearings of the rolling mill frame, while the other roll is rotatably mounted in bearings which are displaceably mounted in the frame for movement in the axial plane of the rolls. With such a design the regulation of the pressure exerted by the hydrostatic supporting devices is substantially simplified by providing a fixed position of one of the rolls.

The roll is provided preferably with several supporting devices which are arranged in a line or row parallel to the roll axis. Supporting devices so designed are simpler and easier to seal, even at high pressures, than if a single pressure device with an elongated bearing surface is used.

Pressure devices arranged in a line can be connected advantageously to different pressure sources of the hydraulic medium in such a way that the pressures can be controlled at different regions in the axial direction. Among other advantages, this ensures a high stability of the roll along its length.

Pressure devices arranged in a line preferably have cooperating pistons and cylinders of circular cross-section, whereas the bearing surfaces facing the roll are rectangular or quadrilateral. The bearing surfaces are advantageously rhomboidal, with the inclined sides of adjacent bearing surfaces overlapping in the circumferential direction. This ensures a good seal of the pistons and cylinders while providing substantially continuous supporting surfaces for the roll and effective cooling of the rolls.

The rolling mill may also be provided with one or more hydrostatic pressure devices for the lateral support of one or more rolls. In this way the rolls can be uniformly supported against lateral forces.

In rolling mills with particularly great demands or pressures, the roll on which the hydrostatic device acts can be a pressure roll which exerts a pressure on a working roll serving to roll the material. Preferably the two working rolls and two pressure rolls are provided in such a rolling mill, and the working rolls are supported laterally by hydrostatic pressure devices.

The invention will now be described more fully in connection with the embodiments represented schematically in the drawings.

FIG. 5 shows a view of an embodiment having rhomboidal bearing surfaces for the pressure devices.

Figure 1:
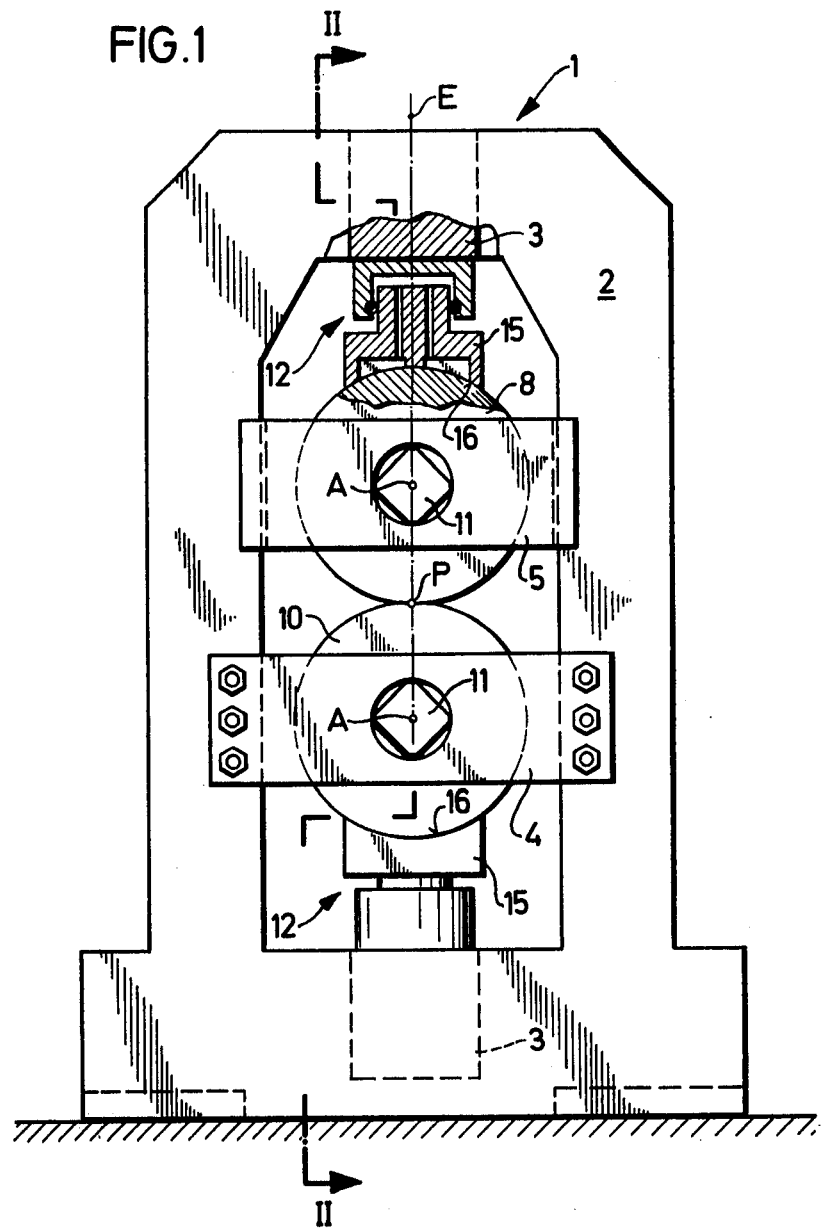
FIG. 1 shows a side elevation of a first embodiment of a rolling mill according to the invention with a partial section through an hydrostatic pressure device along line 1—1 in FIG. 2.
Figure 2:
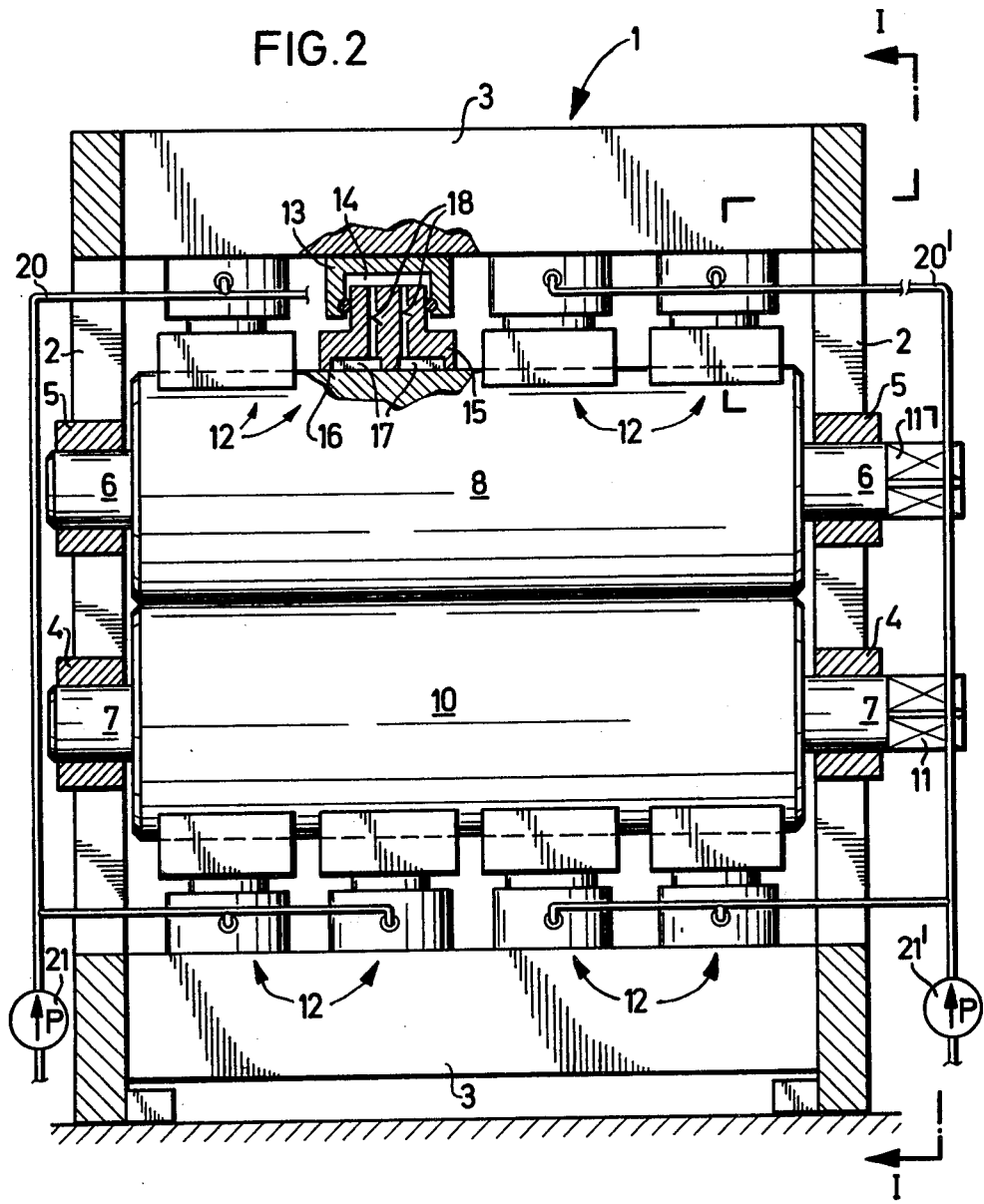
FIG. 2 shows a section along line 11—11 of FIG. 1.

FIGS. 1 and 2 show a rolling mill which comprises a frame 1 with two lateral bearing stands 2 connected by transverse members 3. In the bearing stands are arranged bearing flanges 4 and 5, flange 4 being secured to the stands whereas flange 5 is movably guided in the direction of the common axial plane E of the rolls.

In the bearing flanges 4 and 5 are rotatably mounted journals 6 and 7 of the rolls 8 and 10. Rolls 8 and 10 can be solid, as shown, or hollow. Both rolls 8 and 10 can be driven, which is indicated in FIG. 2 by ends 11 having square cross-sections.

Hydrostatic pressure devices 12 mounted on the members 3 are provided for pressing rolls 8 and 10 toward each other at the pressure point P. This forms a nip between the rolls for rolling the desired material.

The hydrostatic pressure devices 12 each comprise a cylinder 13 in which the piston-type part 15 is sealingly guided, thus defining a chamber 14. The pistons 15 have bearing surfaces 16 facing the exterior surface of the respective roll 8, 10. Each bearing surface is provided with several, preferably four, hydrostatic pressure pockets 17 which are individually connected, independent of each other, to the chamber 14 by the throttle ducts 18. The dimensions are selected so that the bearing surface has an effective cross-sectional area, for example, the area measured perpendicularly to the axis of the piston, which is larger than the effective area of the piston exposed to the pressure in the chamber 14. As can be seen in FIG. 2, the chambers of the cylinders 13 of the hydrostatic pressure devices 12 are connected by distributor lines 20, 20' to sources of the hydrostatic pressure medium, in this case pumps 21, 21'.

In operation, the pumps 21, 21' deliver the hydraulic pressure medium through the distributing lines 20, 20' to the individual pressure devices 12. The medium can be, for example, an emulsion of water and oil or an oil. The hydrostatic pressure medium presses the pistons 15 toward the surfaces of the rolls 8 and 10. At the same time, however, the pressure medium flows through the throttle ducts 18 into the pressure pockets 17, so that a back pressure is built up. Since the hydraulically effective size of the bearing surface 16 is larger than that of the end of piston 15 in cylinder 13, a lower pressure in the pressure pockets 17 suffices to produce a narrow gap between the bearing surface of the piston and the exterior surface of the roll, the pressure medium issuing constantly through this gap. In this way a contact-free hydrostatic support of the rolls is achieved. The operation of the pressure devices is similar to those disclosed in U.S. Pat. No. 3,802,044, but the pressure devices are positioned outwardly of the rolls and act against the exterior surfaces of the rolls, thereby greatly simplifying the construction, and the escaping hydraulic fluid flows around the outside surface where it is most effective to cool the roll.

In the embodiment shown in FIGS. 1 and 2, the ends of pistons 15 in the cylinders 13 are round, which permits a simple manufacture and sealing of the pistons in the cylinders. On the other hand, the bearing surfaces 16 are preferably quadrilateral. The supporting elements 12 can be arranged so close together under certain circumstances that their bearing surfaces 16 adjoin each other so that a substantially continuous uninterrupted support of the roll is obtained. As shown in FIG. 5, the bearing surfaces 16' are advantageously rhomboidal with the inclined sides overlapping in the circumferential direction of the roll.

In operation a certain amount of the pressure medium issues, as mentioned above, through the gaps between the bearing surfaces 16 and the surfaces of rolls 8, 10. Since the heat transfer between the pressure medium and the roll surface is particularly good in narrow gap flow, an intensive cooling of the roll surface can be obtained with a suitable temperature of the pressure medium, and the heat does not penetrate into the interior of the roll.

In the design according to FIGS. 1 and 2, where one of the rolls, in this case the bottom roll, is fixedly supported in the bearing flange 4, special measures to maintain a centered position of the two rolls are not necessary. If the pressures in the chambers 14 of all pressure devices 12 are equal, the rolls will sag slightly under their own weight. If this is to be avoided, care would have to be taken by different pressures in the gaps of the bottom and top pressure devices 12 so that the influence of the weight of the rolls is eliminated.

By connecting the pressure devices 12 to different sources 21, 21', it is possible to control the pressure at different regions of the rolls in their longitudinal direction. Each device 12 can be connected to a separate pressure source, of several pressure devices can be combined in a group, as illustrated, which is connected to a common source. Although the pressure sources are represented as pumps 21, 21', they can also be regulating valves which are fed from a common source.

Figure 3:
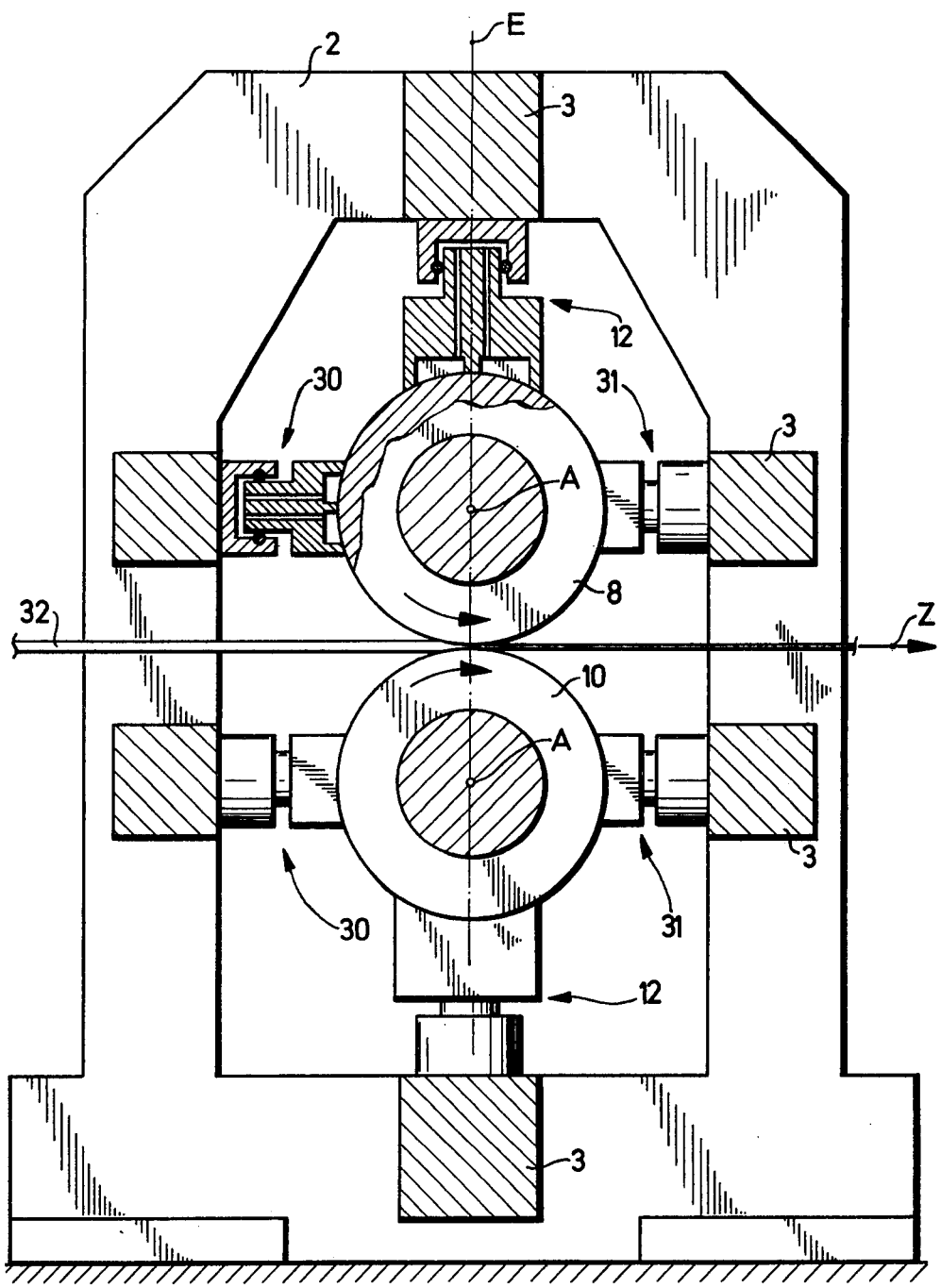
FIG. 3 shows another embodiment of a rolling mill, partially in section perpendicular to the roll axes.

In the embodiment shown in FIG. 3, the rolls 8 and 10 are rotatably supported at their ends in bearing flanges in the same manner as in the embodiment of FIGS. 1 and 2, with the pressure devices 12 acting in the common plane E of the axes A of both rolls. In addition, lateral pressure devices 30 and 31 are provided which are identical in design to the pressure devices 12. As will be understood, the pressures produced by the devices 30, 31 act in a direction lateral to plane E through roll 8 and counter-roll 10. The lateral support is of particular advantage in the rolling of metal strips 32, where considerable forces Z are produced as the strip passes through the rolling mill. The operation is otherwise the same as in the previously described embodiment, but the pressure devices 30, 31 effect a further improvement in the cooling of the roll surfaces.

Figure 4:
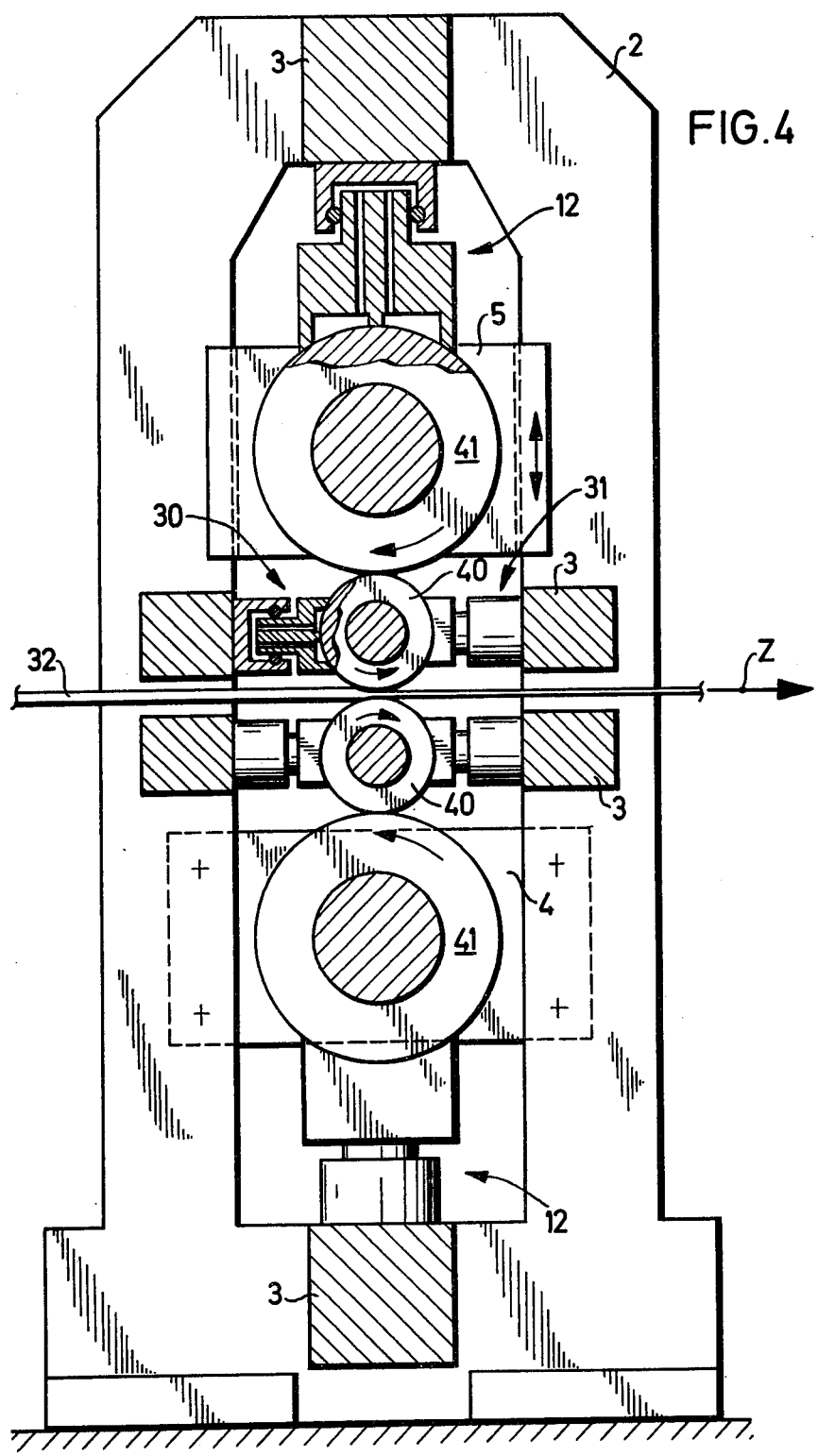
FIG. 4 shows another embodiment of a rolling mill, partially in section similarly to FIG. 3.

FIG. 4 shown an embodiment where special working rolls 40 are provided for rolling the material 32. Rolls 40 are engaged by pressure rolls 41, respectively. The bottom pressure roll 41 can be rotatably mounted in the fixed bearing flange 4. The other rolls may be guided in the vertical direction by corresponding bearing flanges or slides, of which only bearing flange 5 of the top roll 41 is specifically shown. In this case only the working rolls 40, which preferably have a small diameter, are provided with lateral pressure devices 30 and 31.

The rolling mill according to FIG. 4 has the advantage that the working rolls have a small diameter. This reduces the driving forces and also the power required for rolling a given amount of material. Bending of the working rolls in the vertical plane, wherein high pressures are involved, is prevented by the larger diameter pressure rolls 41, with their accompanying hydraulic support devices 12.

Although several pressure devices are provided for each roll in the embodiments, and this arrangement is preferred, it is possible to use, if desired, a single, elongated pressure device such as described in U.S. Pat. No. 3,802,044.

The drive of the rolls of the above-described rolling mills can be effected as required. In the rolling mills according to FIGS. 1, 2 and 3, both rolls or only one of them can be driven. In the rolling mill according to FIG. 4, all four rolls can be driven. If the working rolls 40 have a very small diameter, it may suffice to drive only the pressure rolls 41. On the other hand, however, it is also possible to drive only the working rolls 40, the pressure rolls 41 being frictionally driven by the working rolls.

Although the hydraulic supporting devices act, in the embodiments shown, with their forces either in the axial plane E of the rolls or perpendicularly thereto, they can also be so arranged that their forces are exerted generally obliquely, as required, for example, by the forces or the resultants of forces acting in the rolling mill.

We claim:

1. In a rolling mill having a frame and a plurality of rolls mounted thereon, means for exerting pressure on the exterior surface of at least one of said rolls which comprises at least one hydrostatic pressure device including a cylinder fixed with respect to said frame, a piston movable in said cylinder and defining a chamber therebetween, said piston having at one end a first surface area within said chamber and at the opposite end, a bearing surface facing said exterior surface of said roll, a plurality of hydrostatic pressure pockets formed in said bearing surface and a plurality of throttling ducts connecting said pockets individually with said chamber, and means for continuously applying fluid under pressure to said chamber and to said first piston surface area to force said piston toward said exterior roll surface and to supply fluid through said throttling ducts to said pockets so as to provide pressure fluid between said bearing surface and said exterior roll surface, the effective cross-sectional area of said bearing surface for producing forces between the bearing surface and the exterior surfaces of the roll being greater than the effective area of said first piston surface area exposed to pressure in said chamber so that the forces exerted by said fluid at both ends of said piston are such that said bearing surface and the surface of the roll are maintained in spaced apart relation during operation to permit a continuous fluid flow therebetween thereby avoiding direct contact between said piston and said roll and removing from said roll heat generated during said rolling operation.

2. A rolling mill according to claim 1 including a pair of rolls mounted to form a pressure nip therebetween, each roll of said pair of rolls has associated therewith at least one hydrostatic pressure device, the hydrostatic pressure devices of said rolls being mounted to exert pressures in opposite directions in the common axial plane of the rolls.

3. A rolling mill according to claim 2 in which one of said rolls is rotatably mounted in fixed bearings of said frame and the other roll is rotatably mounted in bearing displaceably mounted in the frame for movement in said axial plane relative to said one roll.

4. A rolling mill according to claim 1 including a plurality of said hydrostatic pressure devices spaced along said roll in a direction parallel to the roll axis.

5. A rolling mill according to claim 3 in which each of said rolls has associated therewith a plurality of said hydrostatic pressure devices spaced along the roll in a direction parallel to the roll axis.

6. A rolling mill according to claim 4 in which the chambers of predetermined hydrostatic pressure devices are connected to different pressure sources of said fluid whereby the hydrostatic pressures between the bearing surfaces of said devices and the exterior surface of the roll may be controlled at different regions along the roll.

7. A rolling mill according to claim 4 in which said hydrostatic pressure devices have cooperating pistons and cylinders of circular cross-section and said bearing surfaces facing the roll are quadrilateral.

8. A rolling mill according to claim 7 in which said bearing surfaces are rhomboidal with the sides of adjacent bearing surfaces overlapping with respect to the circumferential direction of the roll.

9. A rolling mill according to claim 1 in which said hydrostatic pressure device of at least one of the rolls is positioned to exert pressure thereon in the direction of a counter-roll cooerating therewith, and a hydrostatic pressure device of at least one of the rolls is positioned to exert pressure thereon in a direction lateral to the common axial plane of the roll and a counter-roll cooperating therewith.

10. A rolling mill according to claim 1 including a working roll for rolling materials and a pressure roll cooperating therewith, said pressure roll having associated therewith at least one hydrostatic pressure device mounted to exert pressure thereon in the direction of said working roll.

11. A rolling mill according to claim 10 including two working rolls mounted to form a nip therebetween for rolling material, and two pressure rolls engaging said working rolls respectively, each pressure roll having at least one hydrostatic pressure device positioned to press the pressure roll aganst the respective working roll, said working rolls having pressure devices positioned to exert lateral supporting pressures on the working rolls in a direction lateral to the common axial plane of the working rolls.

12. A rolling mill according to claim 1 including a pair of rolls mounted to form a pressure nip therebetween for rolling material, each of the rolls having associated therewith a plurality of said hydrostatic pressure spaced along the roll in a direction parallel to the roll axis and positioned to press the rolls together in the common axial plane of the rolls, and each of the rolls having two rows of said hydrostatic pressure devices on opposite sides of the roll and positioned to exert lateral supporting pressures on the roll in a direction lateral to the common axial plane of the roll.

13. A rolling mill according to claim 1 including two working rolls mounted to form a nip therebetween for rolling material, and two pressure rolls engaging said working rolls respectively, said rolls having a common axial plane, each of said pressure rolls having associated therewith a plurality of said hydrostatic pressure devices spaced along the roll in a direction parallel to the roll axis and positioned to press the working rolls together, and each of said working rolls having two rows of said hydrostatic pressure devices on opposite sides of the roll and positioned to exert lateral supporting pressures on the roll in a direction lateral to said common axial plane.

14. A rolling mill according to claim 13 in which one of said rolls is rotatably mounted in fixed bearings of said frame and the others are rotatably mounted in bearings displaceably mounted in the frame for movement in said axial plane.

* * * * *

UNITED STATES PATENT AND TRADEMARK OFFICE
CERTIFICATE OF CORRECTION

PATENT NO. : 4,041,752
DATED : August 16, 1977
INVENTOR(S) : Anton Dolenc, Alfred Christ and Rolf Lehmann It is certified that error appears in the above-identified patent and that said Letters Patent are hereby corrected as shown below:

In Column 4, line 29, "FIG. 4 shown" should read
-- FIG. 4 shows --

In Column 6, line 10 (Claim 9, line 4) "cooerating"
should read -- cooperating --

In Column 6, lines 34-35 (Claim 12, lines 4-5)
"hydrostatic pressure spaced" should read
-- hydrostatic pressure devices spaced --

*Signed and Sealed this*

*Twenty-second* Day of *November 1977*

[SEAL]

Attest:

RUTH C. MASON
*Attesting Officer*

LUTRELLE F. PARKER
*Acting Commissioner of Patents and Trademarks*